United States Patent
Maddalozzo, Jr. et al.

(10) Patent No.: US 6,434,702 B1
(45) Date of Patent: Aug. 13, 2002

(54) AUTOMATIC ROTATION OF DIGIT LOCATION IN DEVICES USED IN PASSWORDS

(75) Inventors: John Maddalozzo, Jr.; Gerald Francis McBrearty; Johnny Meng-Han Shieh, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/207,481

(22) Filed: Dec. 8, 1998

(51) Int. Cl.[7] .............................. G06F 12/14; G06K 9/00; H04Q 5/00
(52) U.S. Cl. ................. 713/202; 713/184; 340/825; 382/115; 382/125
(58) Field of Search .................................. 713/202, 184, 713/182; 380/25, 23, 4; 382/115, 125; 340/825

(56) References Cited

U.S. PATENT DOCUMENTS

| | | | | |
|---|---|---|---|---|
| 6,130,947 A | * | 10/2000 | Mizaba et al. ................. 380/54 |
| 6,148,406 A | * | 11/2000 | Weist et al. ................. 713/202 |
| 6,185,316 B1 | * | 2/2001 | Buffam ........................ 382/115 |
| 6,209,102 B1 | * | 3/2001 | Hoover ........................ 713/200 |
| 6,276,604 B1 | * | 8/2001 | Proidl .......................... 235/382 |
| 6,324,287 B1 | * | 11/2001 | Angert ......................... 380/43 |
| 2002/0029341 A1 | * | 3/2002 | Juels et al. .................. 713/184 |

* cited by examiner

Primary Examiner—Norman M. Wright
(74) Attorney, Agent, or Firm—Volel Emile; Bracewell & Patterson, L.L.P.

(57) ABSTRACT

A method for ensuring security of a system accessed utilizing a keypad wherein access is provided to said system via a security code entered on the keypad. A security code is entered on the keypad utilizing a first character configuration of the keypad. Following this, the location of one or more access characters on the keypad is repositioned to present a second character configuration of the keypad. The repositioning of the character configuration is completed electronically in a generally random manner. The change in configuration may take place immediately after each user interface, or after a predetermined number of user interfaces.

24 Claims, 3 Drawing Sheets

AUTOMATIC ROTATION OF DIGIT LOCATION IN DEVICES USED IN PASSWORDS

BACKGROUND OF THE INVENTION

1. Technical Field

The present invention relates generally to an improved keypad and in particular to a method for improving the security of a keypad which provides access to a system via a security code punched into the keypad. Still more particularly, the present invention relates to a method for improving the security of a keypad by reducing the chances of determining the security code of the keypad.

2. Description of the Related Art

Security of systems has always been a major concern where limited access to information (or a location) is desired. In many modern systems, restricted access is provided to a select group of users/customers via an alphanumeric keypad which include or are connected to a decoder circuit of some form. These keypads typically have the set of characters exposed to the user's/customer's side for interfacing. These characters are connected to an electronic component with intelligence to recognize the characters entered (decode) and compare it to the code required to provide entrance to the system. The users/customers access the system by punching in an access code or password specifically chosen for that system. Examples of such keypads are those utilized at Automatic Teller Machines (ATM) or cipher locks to secure areas.

Regular keypads have static number configurations. They generally consist of numbered buttons ranging from 0 through 9 and an "*" and a "#" button much like a typical telephone punchpad. The numbers exist in a common pattern and hence the user or anyone with knowledge of the pattern can enter the code without looking at numbers on the keypad.

One example of the utilization of such keypads is in plants which have gated entrances which are accessed via a security code. Individuals with permission to enter the facility are provided with a security/access code which opens the gate and allows entry on to the premises. A more specific and common example of this is gated communities or apartment complexes.

In single code/password systems, the numbers or range of possible numbers (i.e. the number of possible combinations) which make up a user's password is finite and can be deduced in several ways. A non-authorized user may observe a user and the patterns typed in, significantly reducing the security of the system. Additionally, the non-authorized user may acquire the password by analyzing the physical keypads for wear. Wear indicates high utilization and would also significantly narrow down the range of possibilities.

In statistical measure, if we assume a typical keypad with digits 0 through nine and an "*' and "#" button, if the access code is four digits, then the probability of guessing the correct code is (1/9!*1/4!) or 1 chance in 157,464. However, assume that the user can reduce the coded digits to the four most commonly utilized digits based on the wear of the keypad numbers. This probability then reduces to (1/4!) or 1 chance in 24.

Security codes generally are numeric but may also be symbolic. There is therefore a security problem with alphanumeric keypads that are utilized for security passwords. Presently some areas provide for the manual change of the digit locations on the security pads at set intervals. However, this is time consuming and inefficient. Additionally, it does not protect the system immediately after the user has been observed entering the security code.

Therefore, it would be desirable to have an improved method for increasing security of systems accessed utilizing security keypads. Additionally, it would be desirable to have such an improved method for increasing security of systems wherein the keypad configuration changes automatically after each or a series of user interfaces.

SUMMARY OF THE INVENTION

It is one object of the present invention to provide an improved keypad.

It is another object of the present invention to provide a method for improving the security of a keypad which provides access to a system via a security code punched into the keypad.

It is yet another object of the present invention to provide a method for improving the security of a keypad by reducing the chances of determining the security code of the keypad.

The above features are achieved as follows. A method is disclosed for ensuring security of a system accessed utilizing a keypad wherein access is provided to said system via a security code entered on the keypad. A security code is entered on the keypad utilizing a first character configuration of the keypad. Following this, the location of one or more access characters on the keypad is repositioned to present a second character configuration of the keypad. The repositioning of the character configuration is completed electronically in a generally random manner. The change in configuration may take place immediately after each user interface, or after a predetermined number of user interfaces.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
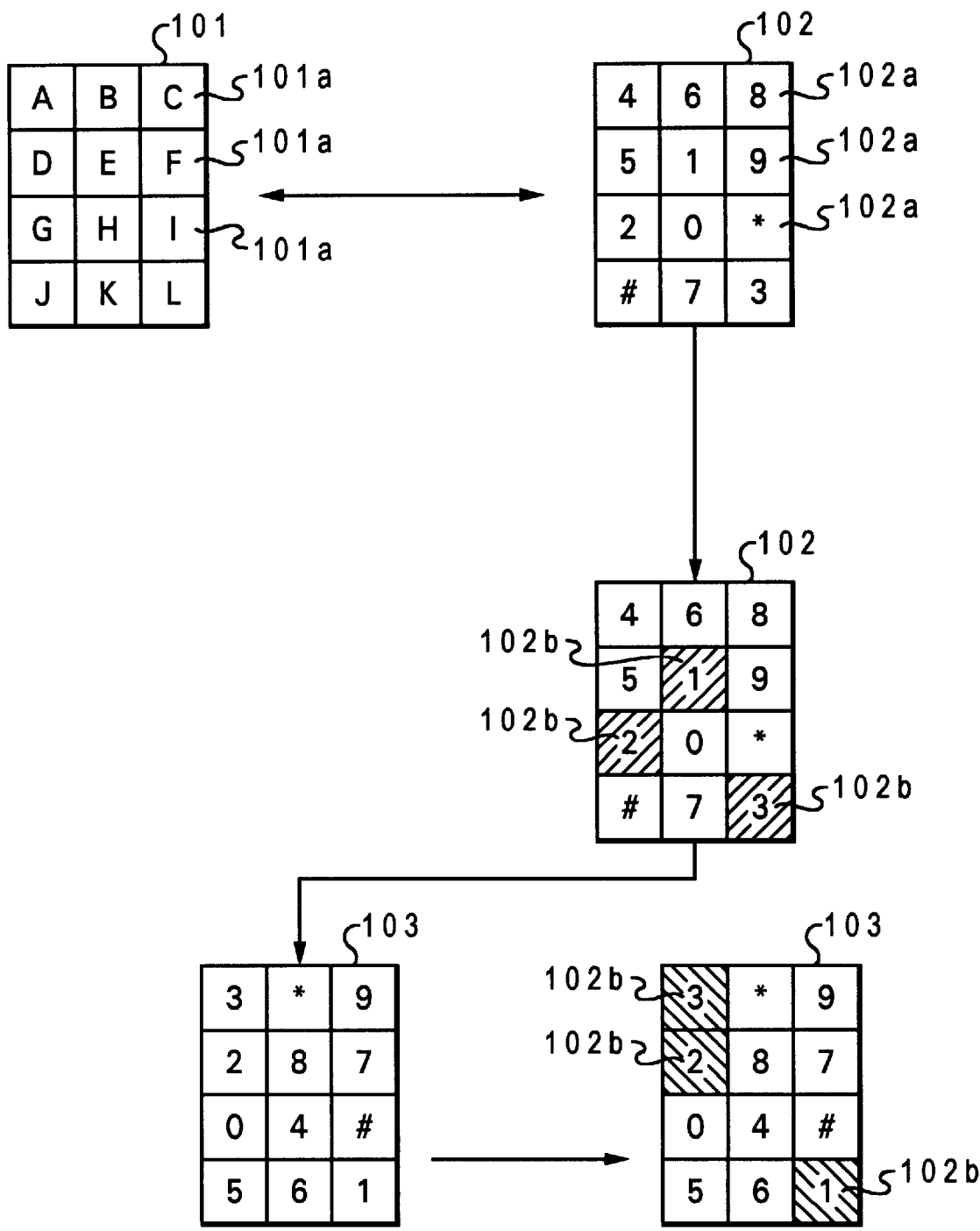
FIG. 1 depicts a series of diagrams depicting the physical layout of a keypad in accordance with one embodiment of the present invention.

The present invention is implemented on a reprogrammable surface such as a touchscreen surface or button surface which utilizes electronic number representations. Electronic representation of characters is achieved in a variety of ways. In one embodiment of the present invention any one of the following methods is utilized including: light emitting diodes (LED); liquid crystal display (LCD); electroluminescent; and cathode ray tubes (CRT). It is understood that the other technology exists for representing characters electronically and may be implemented in this invention. Utilization of manual buttons with the numbers represented with liquid crystal display (LCD) or light emitting diodes (LED) permit the utilization of raised buttons on a keypad structure. Touchscreen pads from ATM machines only requires logic de-codes to make sure that the user is typing in correct numbers/characters. "Characters" as is utilized in this invention, refer to a series of representative elements including numbers, letters, and other symbols. After the user enters a password comprising of a set of characters, the location of the keypad characters get randomly reshuffled so that characters are presented in different locations. By scattering the keypad, the physical utilization of the buttons is changed and ultimately results in the even wear of the buttons. Additionally, people spying on a user will find that the pattern utilized by the person is invalid. In the preferred embodiment, this random reshuffling occurs after every utilization by any user. Since the keypad was scattered before and after utilization, the pattern does not tell the watcher what the actual password/code numbers are. It is understood that although the invention describes a set of characters representing the password entered on the keypad, any number of characters, including a single character, may be utilized as a password within the invention.

The process of repositioning the numbers, coding and decoding the number configuration is implemented utilizing a software algorithm in the preferred embodiment. The invention permits tracking the areas that need to decode scrambled physical locations to real numbers. The numbers are then randomly reshuffled after utilization. Reshuffling occurs internally utilizing the software intelligence which also maps the new location of the digits to allow for decoding of the user's entered code.

The reshuffling numbers may occur at random or in a predefined pattern i.e. after each utilization or after every three utilizations of the keypad. Computer routines are not purely random, and could also be pseudo-random. For purposes of this invention, this random or pseudo-random nature is referred to as "generally random." By scattering the keypad, the numbers are in different physical positions and the wear of the buttons is even. Over a large number of reshuffling the buttons will get even wear. This prevents someone spying on the user from narrowing down the code because the user entered pattern does not reveal the password. Once the reshuffling occurs, entering the same pattern results in a different set of characters from the previously entered code and access to the system is denied.

With reference now to the figures, and in particular with reference to FIG. 1, the present invention is implemented according to the series of diagrammatic representations. FIG. 1 depicts the changing physical location of the input buttons according to one embodiment of the present invention. A keypad 101 is depicted showing a configuration of input button locations 101a which are represented by the letters A through L. This configuration represents the basic keypad framework upon which the invention is implemented. This framework is static, i.e. input button locations 101a remain in place. In the preferred embodiment, the keypad is a numeric keypad 102 with digits 0 through 9 an "*" and "#" button. Numeric keypad 102 in the present invention has the characters located on visually descriptive buttons 102a in random locations. These buttons are visually descriptive in that the characters are displayed on or within the buttons to facilitate interfacing by the user of the keypad. Input button locations 101a correspond to visually descriptive buttons 102a, (i.e. '8' corresponds to location 'C', '*' to location 'I', etc.). In this illustrative embodiment, a user sequentially selects (pushes or touches) digits 1-2-3 102b from the randomized numeric keypad 102. These buttons are illustrated with hash marks over digits 1-2-3 102b on numeric keypad 102. The selection of the digits prompts the keypad decoding mechanism to determine the actual digits selected, the order of selection, and whether these digits represent the correct security code of the system. This process is described in detail below. In the preferred embodiment, once digits 1-2-3 102b have been selected, the numbers are randomly repositioned and the characters given new locations on reconfigured numeric keypad 103. The next authorized user may then selected digits 1-2-3 102b from their new physical location on reconfigured numeric keypad 103 as illustrated with hash marks over digits 1-2-3 102b on reconfigured numeric keypad 103.

Figure 2:
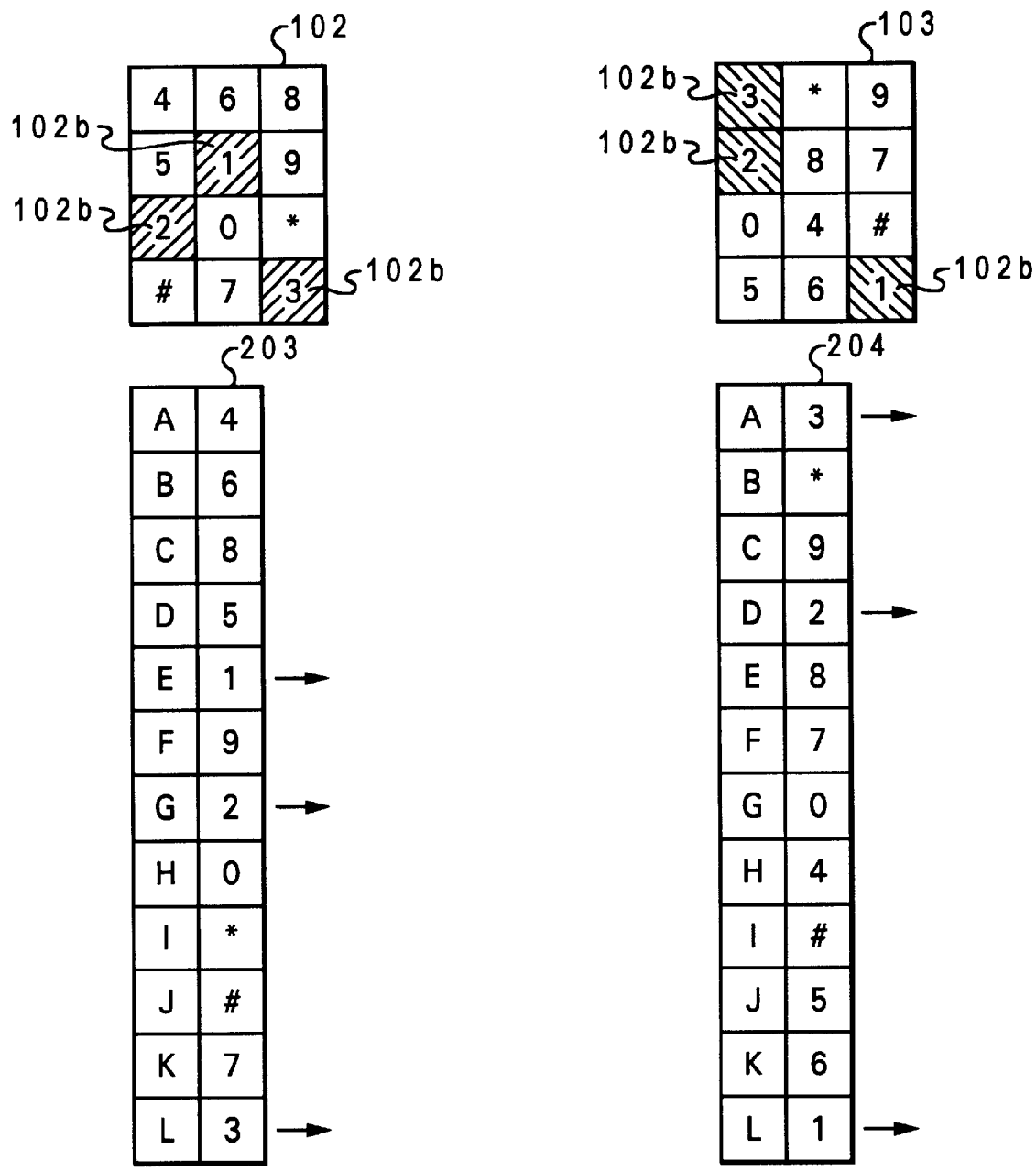
FIG. 2 is a series of diagrams depicting translation decoding according to one embodiment of the present invention.

FIG. 2 illustrates the process which occurs during the decoding of the entered digits on the numeric keypad. A user first selects digits 1-2-3 102b on the first configuration of the character set. The selection is depicted by hash marks over digits 1-2-3 102b on numeric keypad 102. Digits 1-2-3 102b are represented on the framework's physical location E, G, and L of the numeric keypad. Each number is linked in memory to its physical location. In the preferred embodiment, the keypad decoding mechanism reads the internal code saved with this character configuration 203 to analyze the physical locations punched (interfaced) and assign it to the corresponding digit in memory based on character configuration 203. Once this identification is completed, an analysis is conducted to determine if the assigned digits correspond to the correct access code for the system. The system then provides access based on the result of this determination. In the preferred embodiment, the numbers are immediately reshuffled to provide a new configuration. The numeric keypad's digits are repositioned and particularly, digits 1-2-3 102b get translated into the physical location L-D-A. The keypad code mechanism saves this new character configuration 204 and awaits for the next entry of digits by a user on reconfigured numeric keypad 103 according to the preferred embodiment. The next authorized user enters digits 1-2-3 102b utilizing the reconfigured numeric keypad 103 with the digit locations at L-D-C. Once the correct locations are punched (interfaced), the keypad decoding mechanism translates the punched locations into their respective digits and the process of reshuffling and repositioning, etc. begins again. In the preferred embodiment, the reshuffling occurs after each user selection whether or not the correct code is entered. It is understood that the reshuffling may be done at different intervals and be subject to a variety of conditions.

Figure 3:
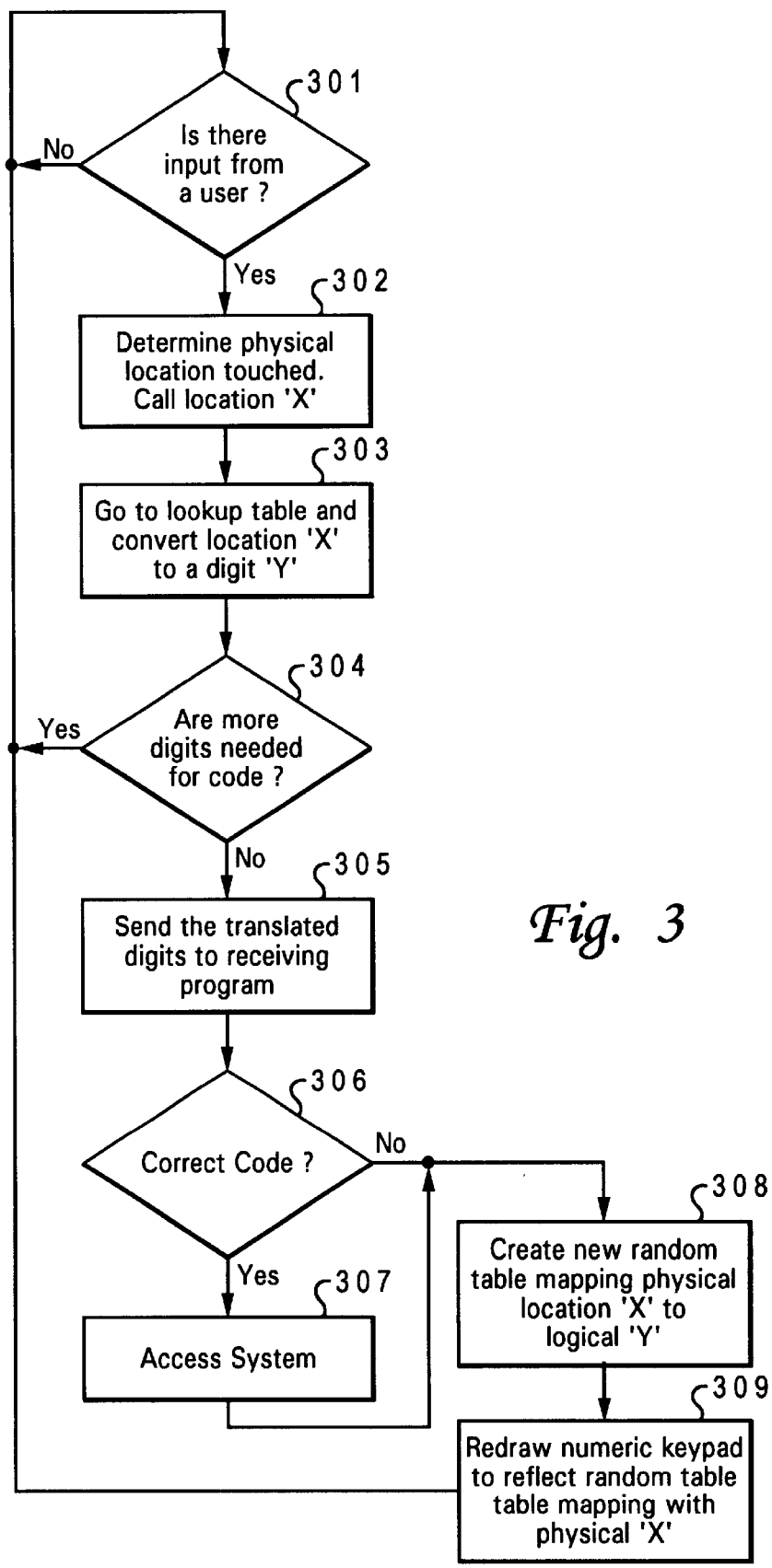
FIG. 3 is a logic flow diagram according to one embodiment of the present invention.

FIG. 3 illustrates the process undertaken in one embodiment of the present invention. The process is repetitive and hence does not include an origination or termination step. The process first waits for an input/interface from a user (step 301). When an input is received, a determination is made of which physical location on the framework was pushed (step 302). The location is given a label 'X.' The process then goes to the lookup table to convert the location 'X' to a numerical/digit 'Y' (step 303). This step corresponds to the digit recognition/decoding step of the keypad decode mechanism described above in FIG. 2. The process then determines if the correct number of digits have been entered/punched in by the user (step 304). If the code has 4 digits, for example, the keypad unit will wait until it has received all four digits before proceeding to evaluate the code. If less digits have been received, then the process returns for additional input/interface from the user. Once the correct number of digits have been received, the process sends the translated digits to the receiving program (step 305) called the security code check mechanism in this illustrative embodiment. If the correct code has been entered (step 306), then the system provides access to the user (step 307). The process then creates a new random table, mapping physical 'X' to logical 'Y' (step 308). The numeric keypad is redrawn so that physical representation reflects the physical 'X' mapping (step 309).

The description of the preferred embodiment of the present invention has been presented for purposes of illustration and description, but is not intended to be exhaustive or limit the invention in the form disclosed. For example, although the repositioning may occur after each utilization, it is understood that the repositioning may occur after, for example, every ten utilizations of the keypad. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A method of ensuring security of a system accessed utilizing a keypad wherein access is provided to said system via a security code entered on said keypad, said method comprising the steps of:

entering a security code on the keypad utilizing a first character configuration of the keypad; and repositioning a location of one or more access characters on said keypad after said entering step to present a second character configuration of the keypad.

2. The method of claim 1, wherein said repositioning is completed in a generally random manner.

3. The method of claim 1, wherein said repositioning step is completed utilizing software algorithm which encodes new location of characters and which decodes said new location to analyze user selected access code.

4. The method of claim 1, comprising further the step of displaying said character configurations utilizing liquid crystal display characters.

5. The method of claim 1, comprising further the step of displaying said character configurations utilizing cathode ray tube (CRT).

6. The method of claim 1, comprising further the step of displaying said character configuration utilizing light emitting diode characters.

7. The method of claim 1, wherein said repositioning step is repeated a very large number of times and the repositioning algorithm is adapted to place different characters evenly among different locations.

8. The method of claim 1, wherein:

said entering step is a later entering step that occurs after an earlier step of entering, one or more times, a security code utilizing the first character configuration of the keypad; and said repositioning step occurs immediately after said later entering step.

9. A system for ensuring security of a system accessed utilizing a keypad wherein access is provided to said system via a security code entered on said keypad, said system comprising:

means for entering a security code on the keypad utilizing a first character configuration of the keypad; and means for repositioning a location of one or more access characters on said keypad after said entering means to present a second character configuration of the keypad.

10. The system of claim 9, wherein said repositioning is completed in a generally random manner.

11. The system of claim 9, wherein said repositioning means is completed utilizing software algorithm which encodes new location of characters and which decodes said new location to analyze user selected access code.

12. The system of claim 9, comprising further means for displaying said character configurations utilizing liquid crystal display characters.

13. The system of claim 9, comprising further means for displaying said character configurations utilizing cathode ray tube (CRT).

14. The system of claim 9, comprising further means for displaying said character configuration utilizing light emitting diode characters.

15. The system of claim 9, wherein said repositioning means is repeated a very large number of times and the repositioning algorithm is adapted to place different characters evenly among different locations.

16. The system of claim 9, wherein:

said entering means is a later entering means that occurs after an earlier means of entering, one or more times, a security code utilizing the first character configuration of the keypad; and said repositioning means occurs immediately after said later entering step.

17. A computer program product for ensuring security of a system accessed utilizing a keypad wherein access is provided to said system via a security code entered on said keypad, said product comprising program instructions in a computer readable medium for:

entering a security code on the keypad utilizing a first character configuration of the keypad; and repositioning a location of one or more access characters on said keypad after said entering step to present a second character configuration of the keypad.

18. The computer program product of claim 17, wherein said program instructions includes program instruction wherein said repositioning is completed in a generally random manner.

19. The computer program product of claim 17, wherein said program instructions for said repositioning includes program instructions for completing said repositioning utilizing software algorithm which encodes new location of characters and which decodes said new location to analyze user selected access code.

20. The computer program product of claim 17, comprising further of program instructions for displaying said character configurations utilizing liquid crystal display characters.

21. The computer program product of claim 17, comprising further of program instructions for displaying said character configurations utilizing cathode ray tube (CRT).

22. The computer program product of claim 17, comprising further of program instructions for displaying said character configuration utilizing light emitting diode characters.

23. The computer program product of claim 17, wherein said program instructions for said repositioning further includes program instructions whereby said repositioning is repeated a very large number of times and the software algorithm is adapted to place different characters evenly among different locations.

24. The computer program product of claim 17, wherein:

said program instructions for said entering includes program instructions whereby said entering is a later entering that occurs after an earlier entering, one or more times, a security code utilizing the first character configuration of the keypad; and said program instructions for said repositioning includes program instructions whereby said repositioning occurs immediately after said later entering step.

* * * * *